(12) United States Patent
Li

(10) Patent No.: US 7,292,606 B2
(45) Date of Patent: Nov. 6, 2007

(54) TWO-STAGE SYMBOL ALIGNMENT METHOD FOR ADSL TRANSMISSION IN THE PRESENCE OF TCM-ISDN INTERFERERS

(75) Inventor: Xiaohui Li, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 917 days.

(21) Appl. No.: 10/674,922

(22) Filed: Sep. 30, 2003

(65) Prior Publication Data

US 2005/0068985 A1 Mar. 31, 2005

(51) Int. Cl.
H04B 3/10 (2006.01)
(52) U.S. Cl. ........................ 370/491; 370/518
(58) Field of Classification Search .............. 370/491, 370/518, 503, 507, 508, 509, 510, 512, 520, 370/524, 465, 478, 515; 375/222, 225, 354, 375/371
See application file for complete search history.

(56) References Cited

U.S. PATENT DOCUMENTS 5,127,027 A * 6/1992 Takahashi .................. 375/362
6,643,340 B1 * 11/2003 Strait ......................... 375/354
6,724,849 B1 * 4/2004 Long et al. ................. 375/371
6,804,267 B1 * 10/2004 Long et al. ................. 370/524

* cited by examiner

Primary Examiner—Chi Pham
Assistant Examiner—Alexander O. Boakye
(74) Attorney, Agent, or Firm—Steven A. Shaw; W. James Brady; Frederick J. Telecky, Jr.

(57) ABSTRACT

Method embodiments for achieving hyperframe symbol synchronization are disclosed, along with device and system embodiments for implementing such methods. In one embodiment, the method comprises: receiving a pilot signal having at least two phase states; measuring the pilot signal as a sequence of measured symbols; and determining an alignment offset upon detecting between adjacent measure symbols a phase difference greater than a predetermined threshold. The alignment offset determination may include: forming a data field of four measured symbols around the detected phase difference; searching for the position of a two-symbol window in the data field that maximizes a phase difference; and calculating the alignment offset from this position.

19 Claims, 3 Drawing Sheets

TWO-STAGE SYMBOL ALIGNMENT METHOD FOR ADSL TRANSMISSION IN THE PRESENCE OF TCM-ISDN INTERFERERS

BACKGROUND

Telephone companies offer customers a number of ways to transport data. One popular way is called Asymmetric Digital Subscriber Line (ADSL). In ADSL, a small portion of the frequency spectrum is used for communicating data from the customer to the central office, and a much larger portion of the frequency spectrum is used for communicating data from the central office to the customer. Each portion of the ADSL frequency spectrum carries data using discrete multi-tome (DMT) modulation, a technique in which data is carried on equally-spaced carrier signals. The combined number of carrier signals from both portions of the spectrum is implementation-dependent. ADSL implementations that comply with the ITU-T G.992.1 standard have 256 carrier signals, while implementations that comply with the ITU-T G.992.2 standard have 128 carrier signals. Future implementations are expected to have 512 or even 1024 carrier signals (see, e.g., ITU-T G.992.5).

DMT modulation provides for very efficient use of the available communication spectrum because the amount of data carried by each carrier signal is individually customized to fit the signal-to-noise ratio profile of the channel. Each carrier signal is allocated a number of data bits, and the allocation of bits may be dynamically adjusted as channel conditions change. Each carrier signal may also be allocated a small individual gain factor to further improve communications performance. The allocation of bits and gain factors to carrier signals is typically performed using tables.

Three tables are typically employed: a gain table, a bit table, and a tone table. The gain table specifies an individual gain factor for each carrier signal. The bit table specifies an individual number of bits allocated to each carrier signal. The tone table may be used to allocate specific data bits to specific carrier signals.

Some channels actually have two signal-to-noise ratio profiles. An example of such a channel is a twisted wire pair in a binder that also carries TCM-ISDN (Time Compression Multiplexing—Integrated Services Digital Network) traffic. TCM-ISDN employs time division multiplexing at a universal, synchronized rate of 400 Hz, i.e. the central office alternately transmits data for 1.25 milliseconds, then listens for data from the customer for 1.25 milliseconds. This causes other channels to experience a noise profile that alternates at a rate of 400 Hz.

The interference can be divided into two types: near-end cross talk (NEXT) and far-end cross talk (FEXT). NEXT results from transmissions traveling in the same direction, while FEXT results from transmissions traveling in opposite directions. Thus, central office transmissions on channels other than a given channel cause NEXT interference on the given channel for the central office and FEXT interference for the customer. Transmissions from customers on channels other than the given channel cause FEXT interference for the central office and NEXT interference for the customer. From either point of view (the central office or the customer), TCM-ISDN signaling alternately causes NEXT interference and FEXT interference. The NEXT interference is generally significantly worse than the FEXT interference, although this depends on the distance that the twisted wire pair travels alongside interfering channels.

The ITU-T G.992.1 and G.992.2 standards each address TCM-ISDN interference in their respective Annex C. Two solutions are offered: dual mode solution and FEXT-only solution. In the dual mode solution, two sets of tables (gain, bit, and tone) are used. One set of tables is used to construct symbols for transmission during periods of NEXT interference ("NEXT symbols"), and the other set of tables is used to construct symbols for transmission during periods of FEXT interference ("FEXT symbols"). Although TCM-ISDN signaling uses a 50% duty cycle, it is expected that on average, only 126/340 (about 37%) of the symbols will be free of NEXT interference, and hence constructible as FEXT symbols.

The FEXT-only solution is similar to the dual mode solution except that no symbols are constructed or sent during the periods of NEXT interference. Because only FEXT symbols are used, only one set of tables is needed. Thus the dual mode solution offers a higher data rate, albeit at some additional cost in the form of additional memory for the second set of tables. In a transceiver that supports both modes, the operator may select the FEXT-only solution to safeguard service reliability.

Annex C defines the concept of a hyperframe that specifies when NEXT symbols should be used, and specifies when FEXT symbols should be used. However, the ITU-T G.992.1 and G.992.2 standards fail to provide a reliable mechanism at the remote (customer) location for properly acquiring hyperframe symbol timing. Misalignment generally causes poor training and may lead to repeated training failures. A reliable alignment technique that is compatible with these standards would be desirable.

SUMMARY

Accordingly, there is disclosed herein method embodiments for achieving hyperframe symbol synchronization, along with device and system embodiments for implementing such methods. In one embodiment, the method comprises: receiving a pilot signal having at least two phase states; measuring the pilot signal as a sequence of measured symbols; and determining an alignment offset upon detecting between adjacent measure symbols a phase difference greater than a predetermined threshold. The alignment offset determination may include: forming a data field of four measured symbols around the detected phase difference; searching for the position of a two-symbol window in the data field that maximizes a phase difference; and calculating the alignment offset from this position.

BRIEF DESCRIPTION OF THE DRAWINGS

A better understanding of the present invention can be obtained when the following detailed description of various invention embodiments is considered in conjunction with the following drawings, in which.

Figure 1:
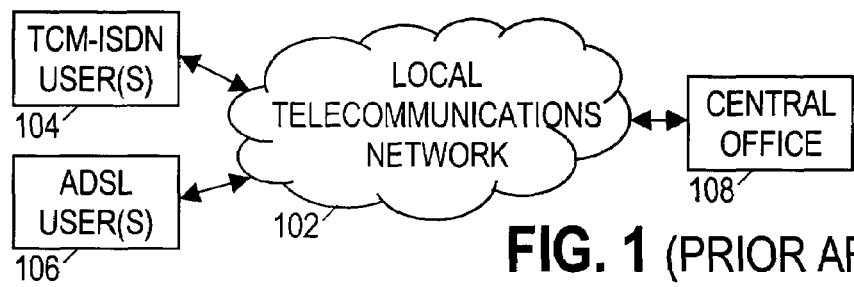
FIG. 1 is a conceptual view of the context for Annex-C based transceivers.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

FIG. 1 shows a local telecommunications network 102 that provides connections between customers 104, 106 and a central office 108. Network 102 may be little more than a cable (or "binder") having many twisted copper wire pairs and associated attachments for electrically connecting each customer to the central office with a corresponding twisted wire pair. Central office 108 is typically connected to other central offices via regional and/or long distance telecommunications networks (not shown). The various central offices cooperatively provide switching services to connect customers.

With the advent of high-speed digital communications, many central offices have been specially equipped to support one or more high-speed digital communications standards. The central offices may include transceivers to communicate with customer equipment using such standards as ITU-T Recommendation G.961 Appendix III ("TCM-ISDN") and ITU-T Recommendation G.992.1 ("ADSL"). The central office transceivers translate between the standards used to communicate across local telecommunications network 102 and a common standard used to communicate with one or more service providers (typically an Internet protocol).

FIG. 1 shows the illustrative situation in which at least one customer 104 is a TCM-ISDN user, and at least one other customer 106 is an ADSL user. In the process of transporting communications between each of the customers 104, 106 and the central office 108, network 102 introduces cross-talk interference. The present disclosure focuses particularly on the transceiver(s) employed by ADSL user(s) 106. These "remote" transceivers 106 may generally follow the specifications of Annex C in ITU-T G.992.1 and G.992.2.

Figure 2:
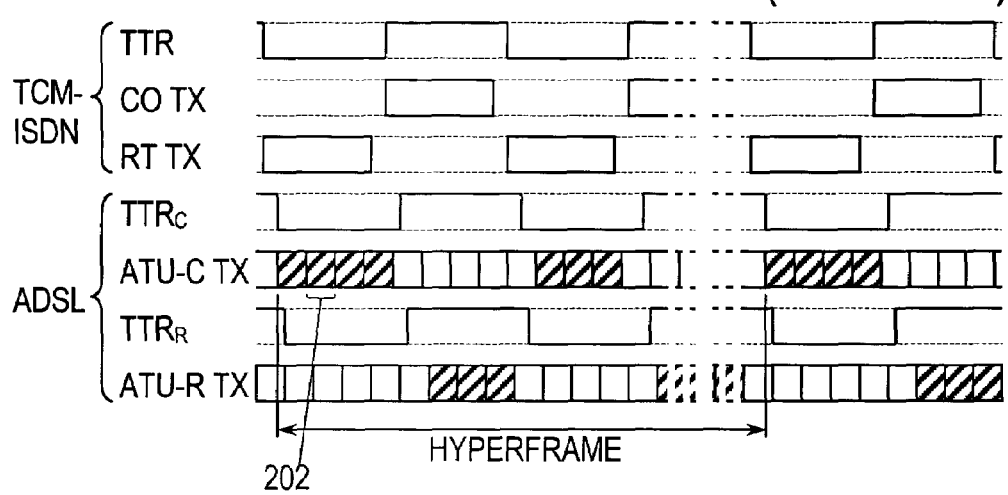
FIG. 2 is a timing diagram showing the time dependence caused by TCM-ISDN interference.

FIG. 2 shows the relative timing of various signals associated with communications through network 102. Associated with the TCM-ISDN communications are a TCM-ISDN timing reference (TTR) signal, a central office TCM-ISDN transceiver (CO TX), and a remote TCM-ISDN transceiver (RT TX). FIG. 2 shows the relative timing between the TTR signal and the CO TX and RT TX transmissions. The TTR signal alternates between two values at 400 Hz with a 50% duty cycle. The central office and the remote transceiver take turns, with the central office transmitting when the TTR signal transitions downward, and the remote transceiver transmitting when the TTR signal transitions upward.

Associated with the ADSL communications are transmissions from the central office ADSL transceiver unit (ATU-C) and the remote ADSL transceiver unit (ATU-R). The TCM-ISDN equipment provides the central office transceiver with a timing reference signal $TTR_C$, and the remote transceiver reconstructs the timing reference signal $TTR_R$.

The period of the TTR signals is not an integer multiple of the length of an ADSL symbol 202, but 34 periods of the TTR signal does equal the length of 345 ADSL symbols. Accordingly, Annex C defines a hyperframe of 345 ADSL symbols, within which a pattern of FEXT and NEXT interference is defined. Those symbols which encounter NEXT interference are sent as NEXT symbols, and the rest are sent as FEXT symbols.

The hyperframes sent by the central office transceiver are synchronized to the $TTR_C$ signal, while the hyperframes sent by the remote transceiver are synchronized to the $TTR_R$ signal. As previously mentioned, the $TTR_C$ signal is provided from the TCM-ISDN equipment, but the $TTR_R$ signal must be reconstructed by the remote transceiver.

Figure 3:
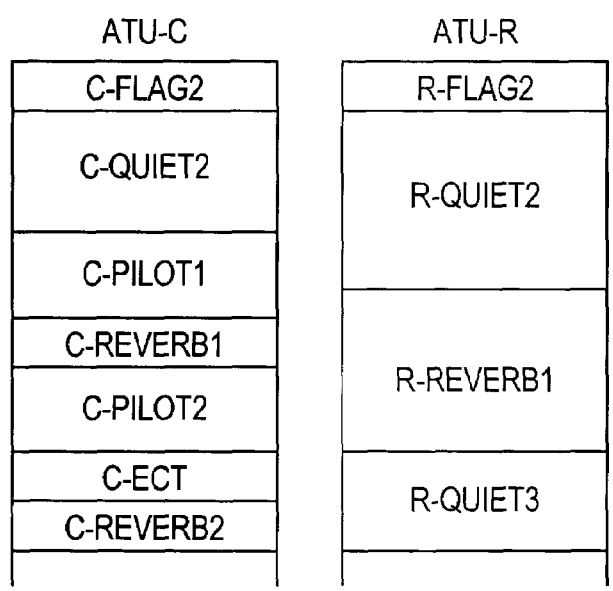
FIG. 3 is a simplified view of a portion of the initialization sequence employed by Annex-C based transceivers.

FIG. 3 shows a portion of the initialization sequence which the transceivers use to determine each other's operating parameters, to identify the channel, and which the remote transceiver uses to reconstruct the TTR signal. The left column shows phases through which the central office transceiver passes, while the right column shows the phases through which the remote transceiver passes. The illustrated portion of the initialization process is preceded by a handshaking sequence such as that provided in ITU-T Recommendation G.994.1.

The G.994.1 handshaking sequence allows the transceivers to negotiate a communications protocol. Once a protocol is selected, the transceivers finish the handshaking sequence by sending a restricted number of flag characters, followed by four "galf" characters. (The flag character is predetermined and the galf character is simply the one's complement of the flag character.) FIG. 3 shows these transmissions as the C-Flag2 phase (for the central office transceiver) and the R-Flag2 phase (for the remote transceiver).

Central Office Transceiver Phases

From the C-Flag2 phase the central office transceiver enters the C-Quiet2 phase. This phase lasts for a minimum of 128 symbols and a maximum of 2048 symbols. During this phase, the central office transceiver sends and receives nothing.

From the C-Quiet2 phase, the central office transceiver enters a C-Pilot1 phase at the beginning of a hyperframe, and. starts counting through the hyperframe transmission pattern. During the C-Pilot1 phase, the central office transceiver transmits an unmodulated pilot tone at one predetermined frequency, and a modulated pilot tone at a second predetermined frequency. The second tone is modulated with a phase shift to indicate which symbols are NEXT symbols and which symbols are FEXT symbols.

Upon detecting the first symbol sent by the remote transceiver (in the R-Reverb1 phase), the central office transceiver starts an initialization counter that establishes synchronization of the initialization process from that point forward. The central office transceiver also measures the received power on a predetermined subset of carrier signals to determine a channel power spectral density (PSD). When the initialization counter reaches 512 symbols, the central office transceiver enters the C-Reverb1 phase.

In the C-Reverb1 phase, the central office transceiver sends a pseudorandom data sequence to allow the remote transceiver to adjust its automatic gain control to an appropriate level. After another 512 symbols, the central office transceiver enters the C-Pilot2 phase.

In the C-Pilot2 phase, the central office transceiver continues to provide the pilot tone and to measure received power. The duration of the C-Pilot2 phase is 3072 symbols.

From the C-Pilot2 phase, the central office transceiver enters the C-ECT phase, which lasts for 512 symbols. The central office transceiver may send a customized signal to train the echo canceller, if the central office transceiver is so equipped. The customized signal should be ignored by the remote transceiver.

From the C-ECT phase, the central office transceiver enters the C-Reverb2 phase. In this phase, the central office transceiver sends the pseudorandom data sequence for 1536 symbols to allow the remote transceiver to perform equalizer training and to achieve synchronization. The central office transceiver continues the initialization sequence beyond this point, eventually transmitting and receiving data.

Remote Transceiver Phases

After leaving the R-Flag2 phase, the remote transceiver enters the R-Quiet2 phase. The minimum duration of this phase is 128 symbols, but the remote transceiver only progresses to the R-Reverb1 phase after it detects such parts of the pilot signal (sent by the central office transceiver during the C-Pilot1 phase) as may be needed for reliable detection. The remote transceiver performs timing recovery and a coarse hyperframe alignment before entering the R-Reverb1 phase.

The R-Reverb1 phase starts on a hyperframe boundary. In the R-Reverb1 phase, the remote transceiver sends a pseudorandom data sequence to allow the central office transceiver to measure the power spectral density of the channel, to adjust its power and gain control settings accordingly, and to synchronize its receiver and train its equalizer. The first 512 symbols coincide in time with the C-Pilot1 phase, the second 512 symbols coincide in time with the C-Reverb1 phase, and the last 3072 symbols coincide in time with the C-Pilot2 phase.

From the R-Reverb1 phase the remote transceiver enters the R-Quiet3 phase in which it transmits silence. The first 512 symbols coincide in time with the C-ECT phase and the remaining symbols coincide with the C-Reverb2 phase. Having completed training of its equalizers, the remote transceiver can more precisely determine the transmitter symbol timing. The standard specifies that the remote transceiver shortens the length of the last symbol in the R-Quiet3 phase to provide a transmitter-to-receiver symbol alignment. The remote transceiver continues the initialization sequence beyond this point, eventually transmitting and receiving data.

Figure 4:
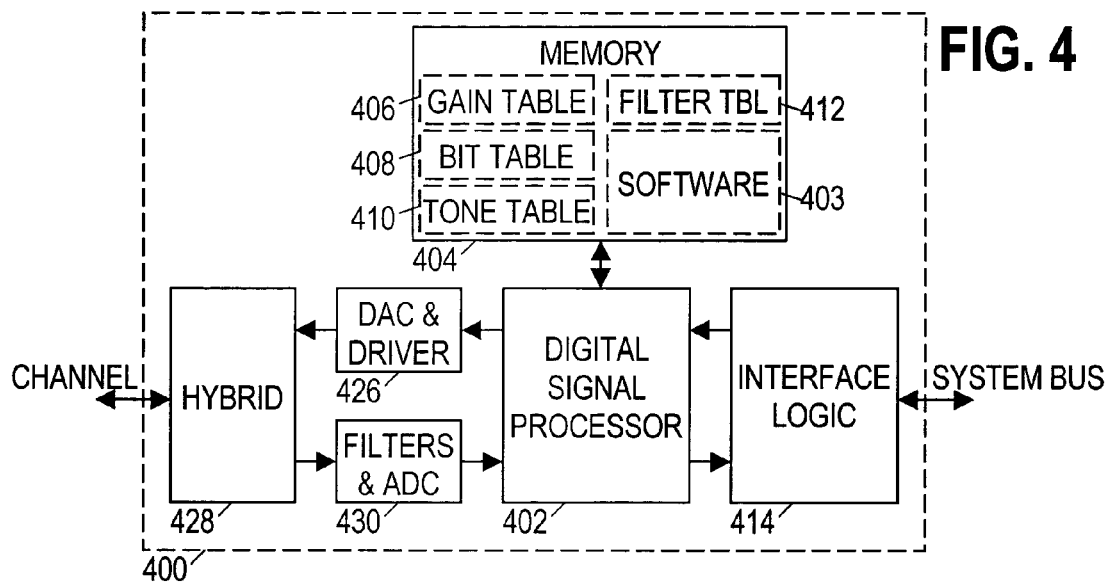
FIG. 4 is a schematic block diagram of an illustrative ADSL modem embodiment.

FIG. 4 shows an illustrative embodiment of a remote transceiver 400 (colloquially termed an ADSL modem). Modem 400 includes a digital signal processor 402 that operates in accordance with software 403 stored in a memory 404. Memory 404 may also include one or two sets of tables, each set consisting of a gain table 406, a bit table 408, a tone table 410, and a filter table 412. Modem 400 further includes interface logic 414 to couple the DSP 402 to a system bus that carries data to and from modem 400.

Modem 400 may also include a transmit circuit block 426, a hybrid 428, and a receive circuit block 430. Together these components couple DSP 402 to a communications channel. Transmit circuit block 426 converts a sequence of digital symbols in serial form into an analog signal, which may then be filtered and amplified to form a transmit signal. The transmit signal is supplied via hybrid 428 to the channel, through which it travels to a receiver. A transmitter at the other end of the channel simultaneously transmits a signal for reception by modem 400. Hybrid 428 operates to extract the receive signal from the channel while at the same time conveying a transmit signal to the channel. Hybrid 428 may include one or more bandpass filters to prevent the transmit signal from interfering with the receive signal. Receive circuit block 430 may equalize the receive signal before converting the receive signal to digital form for DSP 402.

Software 403 may configure DSP 402 to implement the various ADSL modulation and demodulation processes provided by the applicable standards. The modulation process may include:
dividing the data stream into frames;
generation of cyclic redundancy code (CRC) checksums;
randomization (or "scrambling") of the data pattern;
forward error correction (FEC) encoding;
interleaving different portions of the data stream to improve resistance to burst errors;
rate conversion to shield most process steps from rate fluctuations;
determining which set of tables to use based on the symbol type (FEXT or NEXT);
allocation of data to different frequencies (or "tones") using the tone table;
constellation encoding the data on each frequency, perhaps using the bit table;
gain scaling the individual frequencies using the gain table;
transforming the frequency data into time-domain symbols;
optionally providing a cyclic prefix to each symbol; and
converting the time-domain symbols into serial form.

Further details are available in the standards. See, e.g., ITU-T Recommendation G.992.1 (06/99).

The demodulation process generally mirrors the modulation process. Thus, the demodulation process may include:
converting serial data into parallel form;
removing any cyclic prefixes;
transforming time domain symbols into frequency domain data;
determining which set of tables to use based on the symbol type (FEXT or NEXT);
applying a spectral filter (a gain scaling of the individual frequencies) using the filter table;
decoding each frequency amplitude into bits using the bit table;
ordering the bits in accordance with the tone table;
rate conversion to shield subsequent process steps from rate fluctuations;
de-interleaving the different portions of the interleaved data stream;
performing an error correction ("FEC decoding") process;
de-scrambling the data pattern;
CRC checksum confirmation;
extracting data from the frames; and
data error handling.

Further details are available in the standards. See, e.g., ITU-T Recommendation G.992.1 (06/99).

Software 403 may also configure DSP 402 to implement an initialization sequence such as that described for the remote transceiver in FIG. 3. Of particular interest to the present disclosure is the two-stage symbol alignment method which may be implemented by modem 400.

Figure 5:
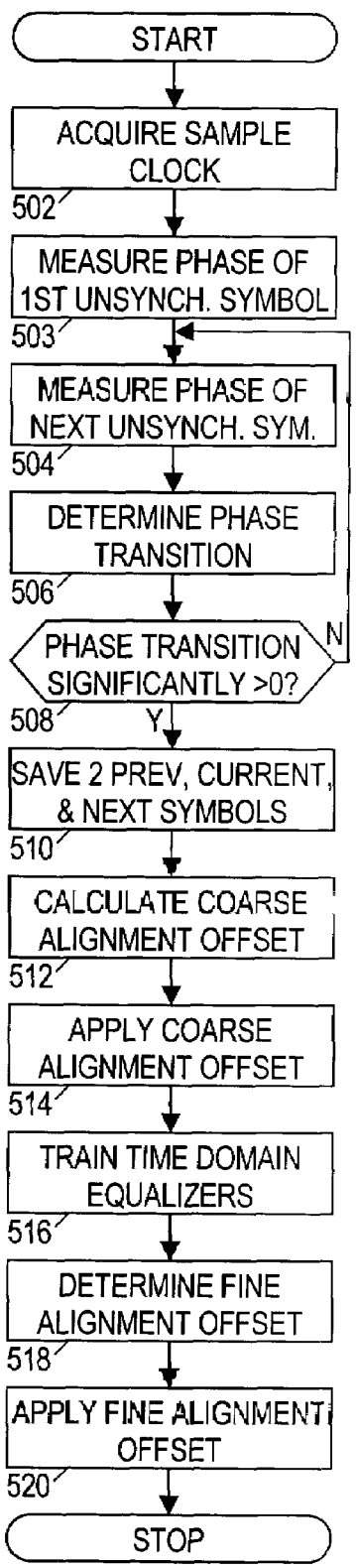
FIG. 5 is a flow diagram of an illustrative two-stage symbol alignment method.
Figure 7:
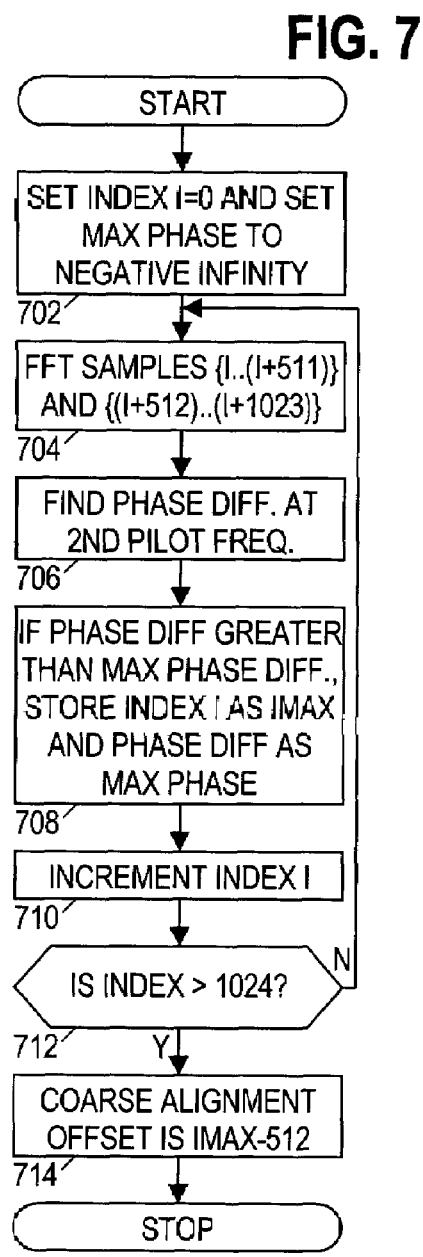
FIG. 7 is a flow diagram of an illustrative coarse alignment offset determination method.

FIGS. 5 and 7 show flow diagrams of an illustrative two-stage alignment method to be implemented by a remote ADSL transceiver. The various blocks represent a set of actions which may be implemented in software, firmware, or hardware. The actions are not necessarily implemented in the precise sequence shown, and indeed, various contemplated transitions provide for concurrent performance of at least some of the actions shown. These actions may be performed out of order and they may be interspersed with other actions that are related or unrelated to the described method. Such variations are within the scope of the appended claim set.

During the R-Quiet2 phase of the initialization sequence, the remote transceiver begins making symbol measurements. As is known to those skilled in ADSL transceiver design, a symbol (sometimes termed "a frame") comprises a predetermined number of samples (e.g., 512 for ITU-T G.992.1) and an optional cyclic prefix. During the initialization sequence, the cyclic prefixes are omitted. These initial symbol measurements are unsynchronized because no symbol timing reference has yet been established. As the central office transceiver enters the C-Pilot1 phase, it begins sending symbols that carry an unmodulated pilot tone at one frequency and another, modulated pilot tone at a different frequency.

In block 502 (FIG. 5), the remote transceiver detects the unmodulated pilot tone and acquires the sample clock. That is, the remote transceiver may synchronize its analog-to-digital conversion clock to the received signal (and hence, to the digital-to-analog conversion clock of the central office transceiver). Using this sample clock, the remote transceiver starts making symbol measurements. The measured symbols are unsynchronized because the correct symbol boundaries have not yet been determined.

In block 503, the remote transceiver prepares to enter a loop comprising blocks 504-508, initializing any appropriate buffers and measuring the phase of a first unsynchronized symbol. In the loop the remote transceiver scans for a symbol boundary based on a phase change in the modulated pilot signal. In block 504, the remote transceiver measures the phase of a subsequent unsynchronized symbol. In block 506, the remote transceiver compares the measured phases of the two most recent symbols to determine a phase difference in the modulated pilot signal. The phases may be determined from the Fourier transform outputs for the symbols at the modulated pilot frequency.

In block 508, the remote transceiver compares the phase difference to a predetermined threshold (e.g., 25% of the modulated 90° phase change between NEXT and FEXT symbols). A phase difference near zero indicates that no NEXT-FEXT symbol transition has occurred around the boundary between the measured symbols, whereas a phase difference near 90° indicates that a NEXT-FEXT symbol transition has occurred approximately at the boundary between the measured symbols. The remote transceiver repeats the loop until the phase difference exceeds the predetermined threshold.

Figure 6:
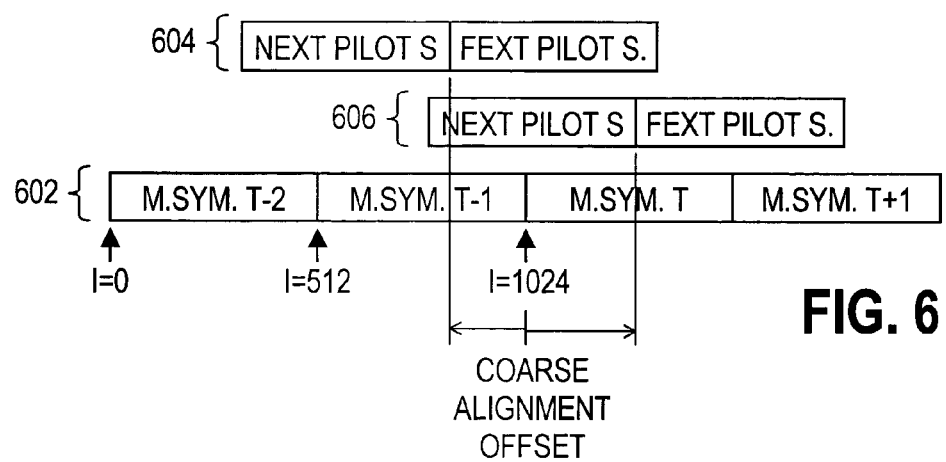
FIG. 6 shows hypothetical relationships between unsynchronized symbols and a pilot signal phase transition.

In block 510, the remote transceiver stores four measured symbols: the two measured symbols having a significant phase transition and the immediately preceding and following symbols (see, e.g., FIG. 6). In block 512, the remote transceiver calculates a coarse alignment offset from the four measured symbols. One embodiment of this calculation is described further below with respect to FIGS. 6 and 7. In block 514, the remote transceiver applies the coarse alignment offset by delaying (or, if it is negative, advancing) the measured symbol boundary by a number of samples equal to the offset. This alignment may be accomplished by altering the position of a buffer pointer, or by altering the length of an arbitrary measured symbol (i.e., adding or dropping samples). Having applied the coarse alignment offset, the remote transceiver can then determine the pattern of FEXT and NEXT symbols to identify the hyperframe boundary.

In block 516, the remote transceiver performs equalizer training. The equalizer training may occur during the R-Quiet3/C-Reverb2 phases. After the equalizer has been trained and enabled, the remote transceiver in block 518 determines a fine alignment offset for final frame alignment, which can then be implemented in block 520 by adjusting a pointer in the receive buffer or by skipping (or repeating) a certain number of samples as dictated by the fine alignment offset. The following discussion describes one method for determining a fine alignment offset.

The equalized channel impulse response h(t) can be estimated in accordance with the following equation:

$$h(t)=IFT(Y(f)/X(f))$$

where Y(f) is the Fourier transform of one coarsely-aligned frame, X(f) is the Fourier transform of the predefined pseudorandom signal sent by the central office transceiver during the C-Reverb2 phase, and IFT(*) is the inverse Fourier transform. The impulse response h(t) calculated from this equation includes 512 taps (or the specified frame length), but most of the energy of the impulse response will be concentrated within a small window of, say, eight taps (the window size should be chosen to be capable of containing most of the energy of the expected channel response, and may be implementation dependent based on the limits of the time domain equalizer). Accordingly, the fine alignment offset may be determined to be the beginning of the window when the window is in a position that maximizes the energy of the impulse response values contained within the window.

The fine alignment offset should be substantially less than half of a symbol length due to the preceding coarse alignment actions. In block 520, the remote transceiver applies the fine alignment offset by delaying or advancing the coarsely-aligned symbol boundaries.

FIG. 6 shows a sequence 602 of four measured symbols at a given time T. Unsynchronized symbol T is considered the current symbol, symbol T-1 is a preceding symbol, and symbol T+1 is a subsequent symbol. Upon detecting a significant, positive phase change, the remote transceiver can establish that a NEXT-to-FEXT pilot symbol transition has occurred in the proximity of the boundary between measured symbols T-1 and T. The transition may precede the boundary as shown by symbol sequence 604, or it may follow after the boundary as shown by symbol sequence 606. The remote transceiver determines a coarse alignment offset which will bring the unsynchronized symbol boundary into alignment with the NEXT-to-FEXT pilot symbol transition.

FIG. 7 shows an illustrative coarse alignment offset determination method. In the discussion of this method embodiment, it is assumed that each symbol is 512 samples long. In transceivers for other ADSL systems, a different symbol length may be suitable. In block 702, the remote transceiver initializes an index i to zero. Other loop variables (such as a maximum phase difference) may also be initialized. In block 704, the remote transceiver performs a Fourier Transform of two 512-sample symbols, the first symbol formed from samples i through (i+511), and the second symbol formed from samples (i+512) through (i+1023). Note that it is not strictly necessary to perform a complete transform, as it is only the frequency coefficients for the modulated pilot signal that are desired for subsequent processing.

In block 706 the modulated pilot signal frequency coefficients for the two symbols are compared to determine a phase difference. This phase difference may be calculated:

phase difference=$imag(X2*conj(X1))=imag(X1)*real(X2)-real(X1)*imag(X2)$ where X1 and X2 are the Fourier transform outputs at the modulated pilot frequency for the first and second symbols, respectively. The functions imag(*), conj(*), and real(*) respectively denote the imaginary part of a complex number; the conjugate of a complex number, and the real part of a complex number.

In block 708, the calculated phase difference is compared to a current maximum phase difference to determine if the calculated phase difference is larger. If so, the calculated phase difference is stored as the current maximum and the current index is stored as $i_{max}$. In block 710, index i is incremented. This increment may be 1, or it may be larger if approximation can be tolerated. In block 712, the index is compared to 1024 (the length of two symbols). If the index is smaller than this value, the remote transceiver repeats blocks 704-712. If the index is larger, the remote transceiver calculates the coarse alignment offset in block 714. The coarse alignment offset may be calculated by subtracting 512 (the length of one symbol) from $i_{max}$. Note that the coarse alignment offset may be negative (indicating that the hyperframe boundary precedes the unsynchronized symbol boundary) or positive (indicating that the hyperframe boundary follows the unsynchronized symbol boundary).

In other alignment embodiments, the search for an index that maximizes the phase difference may be made in multiple stages. In a first stage, the index may be incremented by a large value (e.g. 16) in a search over the full range from i=0 to i=1024 to determine $i_{max1}$. In a second stage, the region around $i_{max1}$ (e.g., from $i_{max1}-32$ to $i_{max1}+32$) may be searched with an intermediate increment (e.g., 4) to determine a more accurate $i_{max2}$. Finally, in a third stage, the region around $i_{max2}$ (e.g., from $i_{max2}-8$ to $i_{max2}+8$) may be searched with a small increment (e.g., 1) to determine the $i_{max}$ value to be used for the calculation of the coarse alignment offset. Other numerical maximization search algorithms are known and may be employed.

Numerous variations and modifications will become apparent to those skilled in the art once the above disclosure is fully appreciated. For example, the absolute value of the phase difference may be compared to the predetermined threshold, or the actual value of the phase difference may be used. As another example, the minimum phase change may be sought rather than the maximum phase change. As yet another example, the foregoing disclosure may be applied to systems having 180° phase changes that denote symbol boundaries. (In this last example, the real part of the Fourier transform output at a given frequency may be used as a surrogate for the phase measurement.) It is intended that the following claims be interpreted to embrace all such variations and modifications.

What is claimed is:

1. A method of achieving symbol synchronization, the method comprising:
   receiving a pilot signal having at least two phase states, wherein the pilot signal transitions between phase states only on a symbol boundary, and wherein the transitions occur not more than once for every two symbols;
   measuring the pilot signal as a sequence of measured symbols;
   calculating a phase difference between adjacent measured symbols; and
   upon detecting a phase difference greater than a predetermined threshold:
   determining a coarse alignment offset; and
   applying the coarse alignment offset to align a boundary between measured symbols with a pilot signal transition;
   wherein said determining a coarse alignment offset comprises forming a data field from two adjacent measured symbols having a phase difference greater than the predetermined threshold, a measured symbol immediately preceding said two adjacent measured symbols, and a measured symbol immediately following said two adjacent measured symbols.

2. The method of claim 1, further comprising:
   training a time domain equalizer after applying the course alignment offset;
   determining a fine alignment offset after training the time domain equalizer; and
   applying the fine alignment offset to more accurately align boundaries between measured symbols with boundaries between received symbols.

3. The method of claim 1, wherein said determining a coarse alignment offset further comprises:
   searching for the position of a two-symbol window in the data field that maximizes a phase difference; and
   calculating an offset from said position.

4. The method of claim 3, wherein said searching for a position comprises:
   indexing through a range of window positions at a coarse increment to determine a first position at which the phase difference is maximized; and
   indexing at a fine increment through a reduced range of window positions surrounding the first position to determine a second position at which the phase difference is maximized.

5. The method of claim 1, wherein said searching for a position comprises:
   systematically indexing through a range of window positions; and
   at each position, measuring a phase difference between two symbols defined by the window.

6. The method of claim 1, further comprising:
   acquiring a sample clock from a second, unmodulated pilot signal received concurrently with the first pilot signal.

7. The method of claim 1, wherein a first of the two pilot phase states is indicative of a symbol sent during a period of near-end cross-talk (NEXT) from a time-compression multiplexing integrated services digital network (TCM-ISDN) communication on another channel, wherein a second of the two pilot phase states is indicative of a symbol sent during a period of far-end cross-talk (FEXT) from the TCM-ISDN communication, and wherein the first and second of the two pilot phase states are separated by 90°.

8. The method of claim 7, wherein the predetermined threshold is 22.5°.

9. The method of claim 1, wherein said calculating a phase difference comprises:
   calculating for each symbol a Fourier transform coefficient associated with a pilot signal frequency;
   determining a phase angle from each said Fourier transform coefficient; and
   finding a difference between the phase angles.

10. A modem that comprises:
    a processor adapted to couple to a channel to receive symbols, wherein the channel experiences alternate intervals of near-end cross talk (NEXT) and far-end cross talk (FEXT), and wherein during an initialization sequence, symbols received from the channel include a pilot tone having phase states indicative of symbols sent during FEXT intervals ("FEXT symbols") and symbols sent during NEXT intervals ("NEXT symbols"); and a memory coupled to the processor and configured to store executable instructions, wherein the executable instructions configure the processor to:

measure a sequence of symbols;

calculate phase differences between adjacent symbols; and determine an offset for symbol alignment after detecting a phase difference greater than a predetermined threshold;

wherein as part of determining the offset, the executable instructions configure the processor to:

establish a data field from two adjacent symbols having a phase difference greater than the predetermined threshold, an immediately preceding symbol, and an immediately following symbol.

11. The modem of claim 10, wherein as part of determining the offset, the executable instructions additionally configure the processor to:

search for a two-symbol window position in the data field that maximizes a phase difference; and calculate an offset from said window position.

12. The modem of claim 11, wherein as part of searching for a two-symbol window position, the executable instructions configure the processor to:

systematically index through a range of window positions; and measure at each position a phase difference between two symbols defined by the window.

13. The modem of claim 11, wherein as part of searching for a two-symbol window position, the executable instructions configure the processor to:

index through a range of window positions using a large increment to determine a first position at which the phase difference is maximized; and index through a reduced range of window positions around the first position using a small increment to determine a second position at which the phase difference is maximized.

14. The modem of claim 10, wherein as part of calculating phase differences, the executable instructions configure the processor to:

calculate for each symbol a Fourier transform coefficient associated with the pilot tone;

determine a phase angle from each said Fourier transform coefficient; and find a difference between the phase angles.

15. The modem of claim 10, wherein the predetermined threshold is about 22.5°.

16. An ADSL communications system that comprises:

a central office transceiver configured to transmit during an initialization phase a sequence of symbols carrying a pilot signal, said pilot signal being modulated to indicate at least two symbol types; and a remote transceiver coupled to the central office transceiver by a communications channel, wherein the remote transceiver is configured to measure a sequence of unsynchronized symbols, and is further configured to determine an offset between an unsynchronized symbol boundary and a pilot signal transition;

wherein to determine said offset the remote transceiver is configured to measure pilot signal changes between adjacent unsynchronized symbols, and after identifying two adjacent symbols having a pilot signal change that exceeds a predetermined threshold, the remote transceiver is configured to search, within a larger region containing the identified symbols, for a two-symbol window position that maximizes a pilot signal change between the two symbols defined by the window.

17. The system of claim 16, wherein the remote transceiver is configured to search for the two-symbol window position by systematically indexing through multiple window positions within the larger region.

18. The system of claim 16, wherein the remote transceiver is configured to search for the two-symbol window position in at least two stages, wherein in a first stage the remote transceiver indexes through multiple window positions in the larger region using a large increment, and wherein in a subsequent stage the remote transceiver indexes through multiple window positions in a reduced region using a small increment.

19. The mode of claim 16, wherein the at least two symbol types include FEXT symbols and NEXT symbols, wherein the pilot signal is modulated at +45° to indicate FEXT symbols and −45° to indicate NEXT symbols, and wherein the predetermined threshold is about 22.5°.

* * * * *